May 6, 1958 G. A. STOVER ET AL 2,833,434

ARTICLE HANDLING MECHANISMS

Filed March 1, 1954 4 Sheets-Sheet 1

INVENTORS
GERALD A. STOVER
EARL F. WALTS
BY
J. Albert Hultquist
ATTORNEY

INVENTORS
GERALD A. STOVER
EARL F. WALTS
BY
J. Albert Hultquist
ATTORNEY

INVENTORS
GERALD A. STOVER
EARL F. WALTS
BY J. Albert Valtquist
ATTORNEY

May 6, 1958 G. A. STOVER ET AL 2,833,434

ARTICLE HANDLING MECHANISMS

Filed March 1, 1954 4 Sheets-Sheet 4

INVENTORS
GERALD A. STOVER
EARL F. WALTS
BY
J. Albert Hultquist
ATTORNEY

United States Patent Office 2,833,434

Patented May 6, 1958

2,833,434

ARTICLE HANDLING MECHANISMS

Gerald A. Stover, Waterloo, and Earl F. Walts, Union Springs, N. Y., assignors to Sylvania Electric Products Inc., a corporation of Massachusetts Application March 1, 1954, Serial No. 413,401

7 Claims. (Cl. 214—313)

The present invention relates to article handling equipment and particularly to mechanisms for transferring and inverting bulky, yet fragile objects. The invention finds special application in the production line processing and assembly of television picture tubes.

The handling and processing of bulky and weighty objects which are fragile presents a problem in establishing assembly lines for automatically and continuously effecting a prescribed sequence of manufacturing steps. The difficulties normally encountered may be best appreciated by considering an illustrative production situation, for example, the many handling and processing steps in the manufacture of television picture tubes. It will be apparent, however, that the structures illustrated in this environment, and claimed below, are capable of other applications and the claims should be construed accordingly.

In the production of television picture tubes, the glass picture tube envelope, often weighing as much as fifty pounds and measuring approximately thirty inches across its face, must undergo a sequence of operations, including steps in which it must be chemically treated, as by cleaning with an acid; washed to remove chemical residues and the like; provided with phosphor screen on the inside of its face, as by well known screen settling processes; dried to harden the settled screen; internally coated with a conductive material to provide certain electrodes, as by the application of a colloidal suspension of graphite to prescribed surfaces; assembled with further components, such as the electron gun which is to be inserted in the tube neck; and finally exhausted, sealed, and electrically treated to obtain required tube properties. At various times during these several steps, it may be necessary to transfer the partially processed tube from machine to machine. Often the transfer operation involves inversion of the tube preparatory to the next operation. For example, the chemical cleaning and washing step is most advantageously accomplished with the tubes inverted such so their faces are uppermost, the downward orientation of the open neck providing an inlet for the cleaning fluid as well as an outlet for draining; whereas a subsequent processing step, involving the settling of the phosphor screen, requires the tube envelope to act as a vessel for containing a fluid carrying the screen-forming material and appropriate binders. Obviously the tube envelope must be inverted for this operation.

These transfer steps may be accomplished manually, but, when so done, present a serious production problem requiring many strong workers to handle the relatively heavy components. The weight involved in the glass blank is large, and becomes of extreme concern when handling envelopes which are partially filled with a charge, as during the screen settling process when a partially filled envelope may weigh as much as one hundred and fifty pounds. Apart from slowing down production and contributing substantially to operation cost, manual handling of the easily cracked or chipped envelopes runs a great risk of breakage with danger to the handling personnel. High shrinkage can be reasonably expected, even if the workers are thoroughly indoctrinated and impressed with the high cost of the tube envelopes.

Accordingly, it is an object of the present invention to provide automatic mechanisms for transferring rather bulky heavy articles which obviates one or more of the aforesaid difficulties. Within the contemplation of the present invention is the provision of article handling means which may be integrated into article processing production lines for transferring articles between successive operations, with or without inverting the article during transfer operation.

Apart from the general consideration of compatibility with other mass production equipment and efficient plant operation, the article handling mechanisms frequently may be called on to perform other functions than handling, as a contribution to successfully carrying out a process. Such an operation may be the decanting of exhausted screen settling fluids from the tube blank at the end of the screen settling operation. The usual screen settling process employs gravity settling during which the phosphor and binder materials settle out of a fluid onto the inner side of the viewing surface of the cathode ray tube, followed by a very slow decanting operation which removes the exhausted phosphor carrier fluid from the tube envelope by pouring. Of critical importance during decanting, is a smooth, gradual and vibration-free turning operation which minimizes disturbances of the fluid as it is poured off. The settled screen material has not become attached to the tube surfaces at this point in the operation and is very sensitive to motion in the settling fluids. Transient or rapid motion of the fluids during decanting must be avoided in order to leave behind a phosphor coating of a thoroughly even nature. Various apparatus which have previously been devised for performing a number of the preceding steps relate to a conveyor belt system which performs the functions of carrying the cathode ray tube blanks past a station for loading the phosphor screen settling materials into a section where the screens settle through a decanting operation and subsequent drying operations. Such apparatus however are poorly adapted to fully mechanized production facilities since the loading, screen settling fluid supply, and unloading steps must be carried out at one end of the machine, necessitating the use of a large number of employees in a small space and resulting in considerable confusion, loss of time, as well as hazard to the employees who handle the heavy, fragile cathode ray tube blanks. Adding to the crowding in this area, is the need to bring supply and delivery conveyors into reasonably close proximity to the loading and unloading station so as to require a minimum amount of time for product handling and to permit the conveyor travel time to be limited by the time required for settling the screens rather than time required for loading and unloading cathode ray tube blanks.

Accordingly, it is a further object of the present invention to provide automatic handling mechanisms for carrying out a sequence of transfer and inverting movements with carefully controlled, gradual rates of acceleration, and substantially vibrationless motion.

A still further object of the invention is the provision of article handle mechanisms for moving an article through transfer and inverting cycles which are readily adjustable to varying demands in timing and duration of various movements as determined by operational requirements, which may be integrated into a substantially continuous flow production operation, and which is constructed to implement efficient plant layout and avoid crowding of personnel into limited areas.

The above and still further objects and features in the present invention will be more fully appreciated upon reference to the following detailed description of a presently preferred embodiment, when taken in conjunction with the accompanying drawings, in which, Fig. 1 is a plan view of an article handling device embodying features of the present invention, shown during the transfer of a television tube or television picture tube blank from a first conveyor to a second conveyor;

Figure 1:
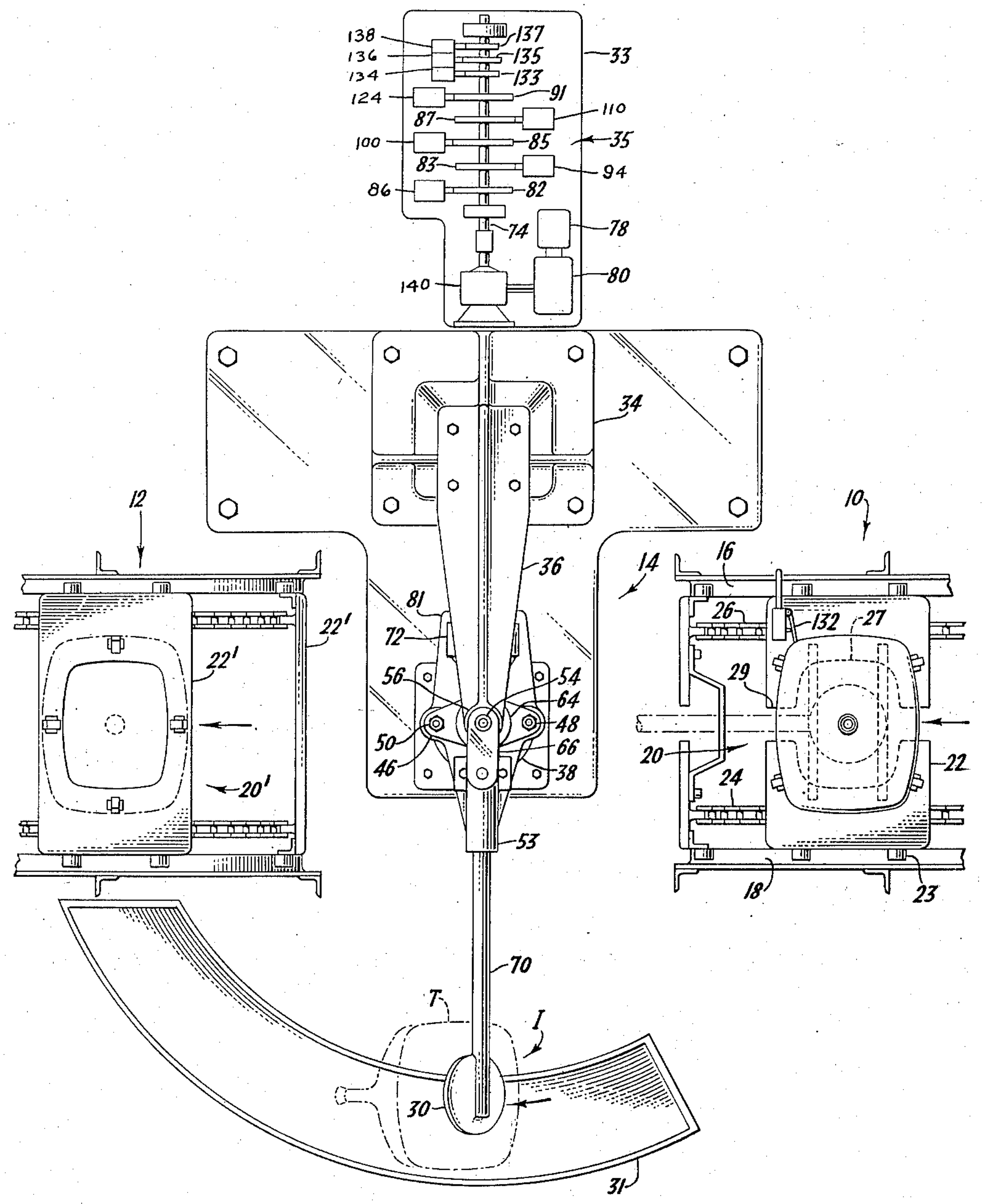

Referring now specifically to the drawings, there is shown a pair of conveyors 10 and 12 arranged in end-to-end alignment for advancing plural articles along a production line, a transfer station 14 being interposed and coordinated with the respective conveyors 10 and 12. The conveyors 10 and 12 may be of any suitable design, the illustrative construction including spaced parallel guide rails 16, 18 supported on a suitable frame and each including horizontal upper and lower straight runs interconnected by a curved end run 19 (see Fig. 2) beyond the tube transfer location 20. Mounted for movement on the guide rails 16, 18 are successively spaced pallets 22 each of which is supported for rolling motion on appropriate wheels 23 or the like. Each of the pallets is provided with self-adjusting feet 25 for conformably supporting the cathode ray tube blanks T and has a central cut-out 27 and opens towards the transfer station 20 at the lateral slot 29, the combination having a configuration such that an article pick-up head, subsequently to be described, may have access to the article carried. A suitable drive is arranged to advance the pallets 22 in succession toward the transfer location 20, and uses drive chains 24, 26 trained over sprockets and connected to a motor, not shown.

It need be said here only that the conveyor must operate smoothly so as to avoid disturbing the screen settling fluid S and that the conveyor motion be indexed and subject to outside control so that individual blanks T may be presented at the transfer location 20 on command. Such conveyor arrangements are well known in the art.

The conveyor 12, on the opposite side of the transfer apparatus, is similar in all material respects to the conveyor 10 and serves to carry the cathode ray tube blanks T through a drying cycle. Advance of the drying conveyor 12 may be coordinated with the operation of the settling conveyor 10 by well understood means. On the other hand, if the drying conveyor 12 is to be indexed only after having received a transferred tube from the station 14, an appropriate sensing element, operating in response to delivery of the transferred tube at the receiving station 20', may initiate an index step to carry the loaded pallet away and bring an empty one into place.

A number of other units are located around the handling apparatus 14 and are best seen in Fig. 1. These include an arcuate spillway 31 which may be used for receiving decanted screen settling fluid and a base 33 which supports the hydraulic timing system 35, which is to be described later.

Reference will now be made to the handling apparatus 14 which picks up successive tube blanks from pallet 22 at the loading location 20 of the conveyor 10, raises and inverts the picked up tube while moving it to the unloading location 20' on conveyor 12, and deposits the transferred and inverted tube on pallet 22'. Preliminary to a a detailed discussion of the transfer apparatus, the particular movement sequence of the illustrative transfer and return cycle will be broadly set forth.

Figure 2:
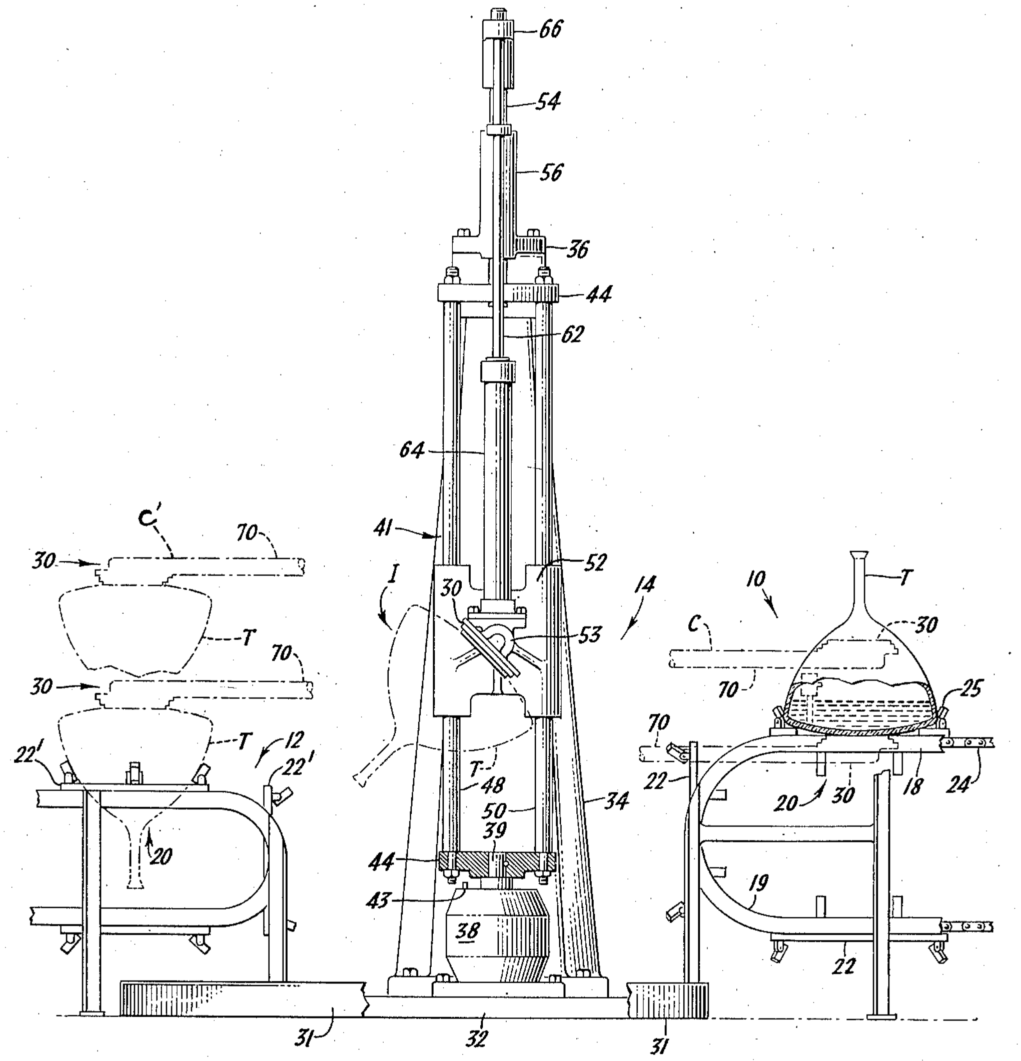
Fig. 2 is a front view in elevation of the transfer mechanisms shown in Fig. 1 with the television tube in position for transfer, subsequent positions of the television tube during transfer being illustrated by the dot-dash lines.

It will be appreciated, after considering the detailed description of the handling apparatus which follows the description of the cycle, that there is a great deal of permissible flexibility in the sequence and the timing of the various motions and events in the transfer and return cycles. Referring to Fig. 2, the cycle may be said to start with the pickup head 30 in loading position at loading station 20 of the conveyor 10 and in position beneath the picture tube blank T. The head or chuck 30 is then raised from this position, carrying the blank T to a clearance position, designated C, above the conveyor 10. At this point the gripping head 30 is swung through a predetermined arc, substantially horizontally, to a second clearance position C' overlying and spaced above the conveyor 12. Thereupon the head 30 is lowered into conveyor 12 with the head centered at the loading station 22', at which time the transferred and inverted blank is deposited on the underlying pallet on conveyor 12. During the arcuate traverse or swing of the head 30 between the respective clearance position C, C', the head 30 and its load are turned over, a partially turned position being illustrated by the phantom lines and designated by the letter I.

Figure 3:
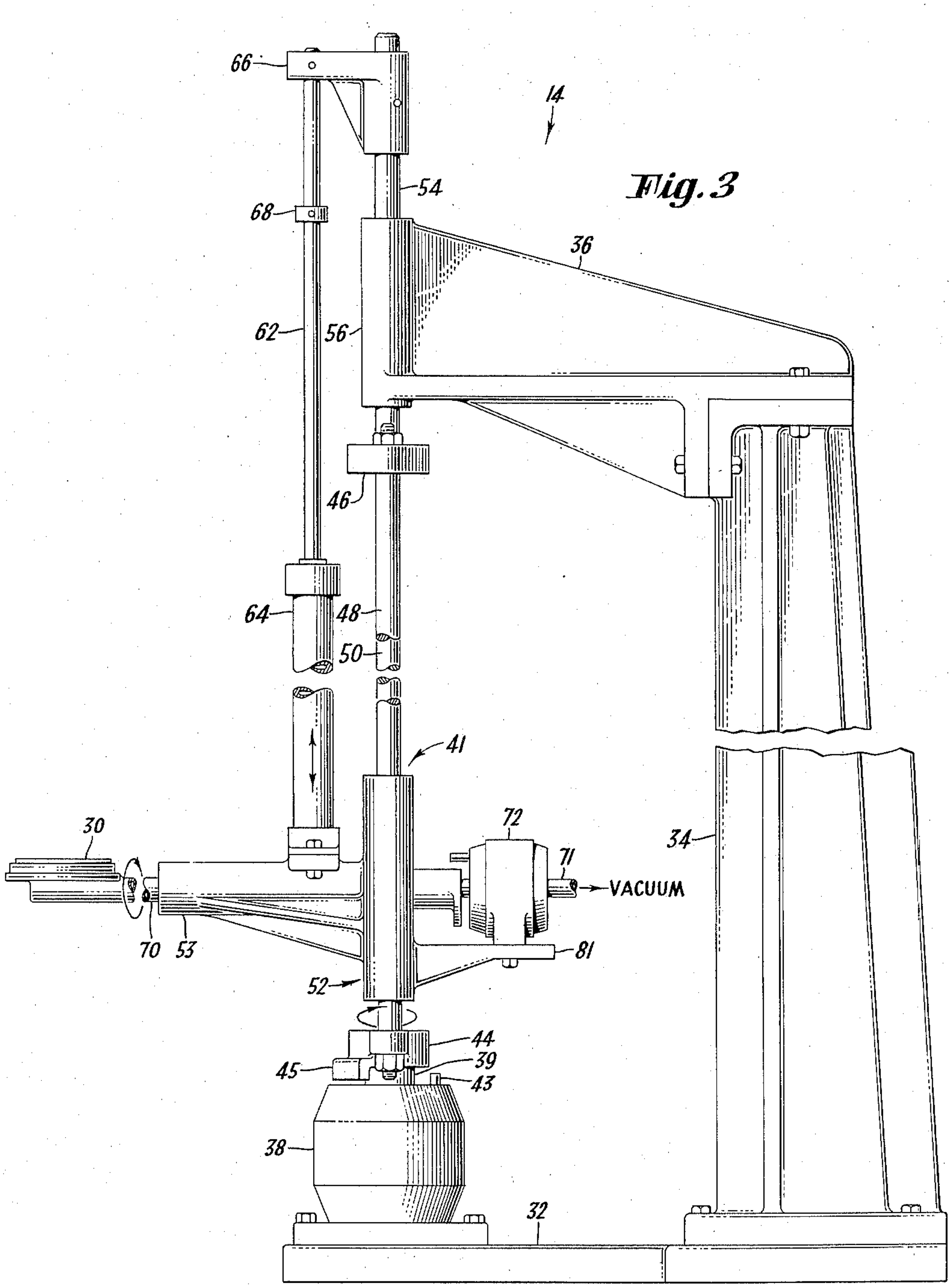
Fig. 3 is a side elevation view, with parts broken away, showing further details of the transferring and inverting mechanisms of Figs. 1 and 2.

Referring now to details of the handling mechanism 14, there is shown in Fig. 3 a base 32 carrying standard 34, the upper end of which has a lateral extension 36. The outer end of the lateral extension 36 carries a vertical bearing 56 in which vertical stub shaft 54 is journalled. Directly beneath the vertical stub shaft 54 and fixed on the base 32 is a rotary hydraulic actuator 38, commonly called a "hydromotor," which provides high-torque, reversible power at its vertical output shaft 39. (The construction of the rotary actuator 38 is shown schematically in Fig. 5 and includes a housing 40 and a reciprocating rotary vane 42 connected to the output shaft 39.) Suspended between vertical shafts 39 and 54 is a yoke 41 which provides a vertical track for reciprocation of the head carriage 52. The rotary actuator 38 is provided with a thrust bearing (not shown) to take up the weight of the yoke 41, carriage 52, etc. The yoke 41 is provided with lower and upper cross members 44 and 46, respectively, which are fastened at their centers to the vertical shafts 39 and 54, respectively, and at their extremities to a pair of vertical guide shafts 48, 50. One or more stops 43 may be provided on the upper portion of rotary actuator 38 to engage pin 45, which depends from lower cross member 44 in order to limit rotation of the yoke about the vertical axis provided by shafts 38 and 54. The vertical guide shafts 48, 50 provide an upright track or runway along which the carriage 52 is mounted for vertical reciprocation.

Vertical reciprocation is imparted to the head carriage 52 by a hydraulic cylinder 64 driving piston shaft 62. The cylinder 64 is fixed to and moves vertically with the carriage 52, while the piston shaft 62 is stationary relative to the movable assembly and has its uppermost end fixed to a bracket 66 carried on the upper end of the vertical stub shaft 54. An adjustable stop 68 may be fixed at a predetermined location on the piston shaft 62 to limit the upward travel of head carriage 52.

Figure 4:
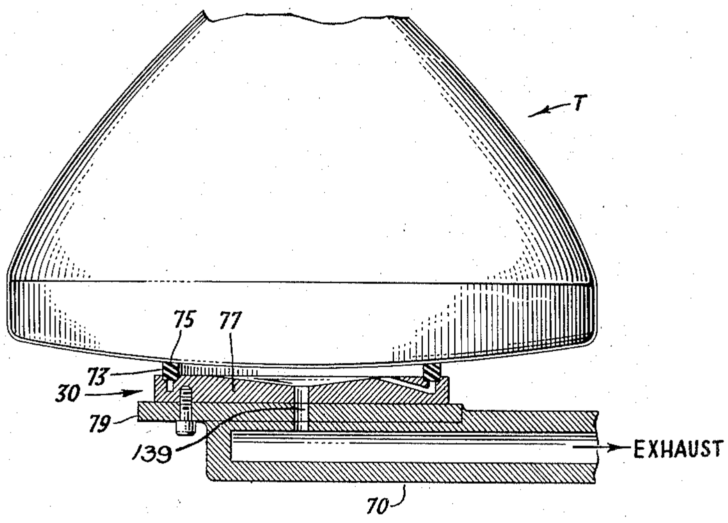
Fig. 4 is an enlarged detail, with parts broken away, of a preferred form of article engaging vacuum chuck for use with the mechanism of Figs. 1 to 3 inclusive; and, Fig. 5 is a diagrammatic showing of a hydraulic system driving the article transfer and inverting mechanisms of Figs. 1 to 3, in accordance with the present invention.

The head carriage 52 carries a horizontal hollow head shaft 70 in a horizontal bearing passage which is centrally located in head carriage arm 53. To minimize unbalanced stresses, the axis of the shaft 70 is made to intersect the vertical axis of the yoke 41. The shaft 70 provides a passage for air between the vacuum cup of gripping head 30 and flexible supply line 71. The head 30, which may be seen in detail in the sectional view of Fig. 4, includes an elastomer ring or gasket 73 having a surface 75 which conforms to the face of the cathode ray tube blank T. The ring 73 is channelled in circular supporting plate 77 which is in turn bolted to base plate 79 on head shaft 70. The vacuum cup thus formed is connected by a hole 139 to the head shaft 70. Returning again to Fig. 3, it will be seen that angular motion is supplied to the head shaft 70 by a rotary hydraulic actuator 72 supported on head carriage motor bracket 81.

Figure 5:
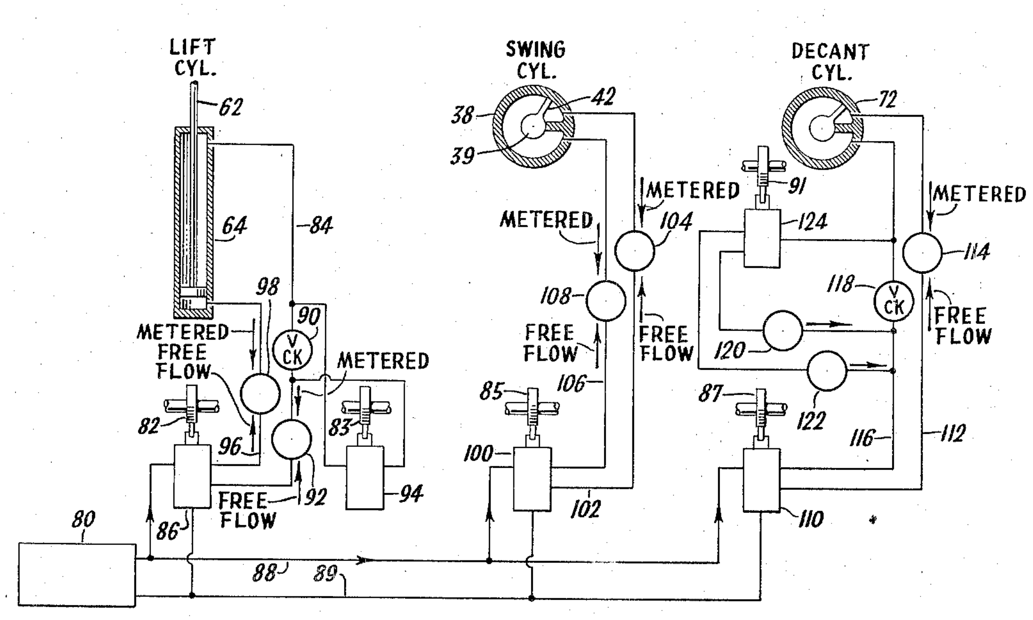

Reference will now be made to Figs. 1 and 5 which best show the details of the hydraulic drive and timing system 35. Looking first at Fig. 1 which illustrates the general mechanical layout of a preferred arrangement, timing motor 140 drives timing shaft 74 through a suitable internal reduction gear system. A hydraulic pump and supply system 80, which is of conventional design, driven by motor 78, supplies hydraulic fluid under pressure through the timing system to the linear and rotary actuators 64, 38 and 72. On the timing or cam shaft 74 are the plural cams 82, etc. which effect operation of various valves 86, 94, 100, 110, 124 and switches 134, 136, 138 to obtain the desired coordination and timing of operation of the actuators and the conveyors, as will become clear upon consideration of the diagrammatic showing of the control system in Fig. 5 and the typical cycle of operation described below.

Operation of the hydraulic lift cylinder 64 which produces vertical displacement of the vacuum chuck 30 is controlled by two position valve 86 and by-pass valve 94 which direct the flow of hydraulic fluid to and from supply line 88 and return line 89. The upper end of the cylinder 64 is connected by feed line 84, through check valve 90, metering and full flow valve 92, and one side of two-way valve 86 to the supply line 88 or return line 89 of the hydraulic unit or system, depending upon the position of two-way valve 86. The position of two-way valve 86 is determined by rotation of cam 82. By-pass valve 94, operated by cam 83, permits reverse direction flow of hydraulic fluid around check valve 90 at times to be described below. The lower side of cylinder 64 is connected through metering and free flow valve 98 to the other outlet of two-way valve 86, by feed line 96.

To raise the cylinder 64, hydraulic fluid is forced into the upper side of the cylinder through valves 90 and 92, fluid under pressure being supplied from the cam-set two-way valve 86. The rate of rise of the cylinder is controlled by metering the flow of return fluid from the bottom portion of cylinder 64 through valve 98, which performs its metering function when fluid flow is away from cylinder 64. The extent of upward drive is controlled by two-way valve 86 which in its neutral position prevents the flow of hydraulic fluid in the lift portion of the system, outward flow being prevented by check valve 90. Lowering of the carriage 52 is accomplished by reversing the flow of fluid through two-way valve 86, applying pressure through valve 98 (which does not impede the flow of fluid in this direction), to the lower side of lift cylinder 64. This forces fluid through the line 84, through by-pass valve 94, which has been opened by cam 83, and through valve 92, which now operates to meter the flow and control the rate of descent, to two-way valve 86 and thence to fluid return line 88.

Operation of the rotary actuator 38 which provides horizontal swinging motion to the carriage 52 is accomplished by controlling the reversible flow of fluid from supply and return lines 88, 89 to the actuator by means of two-way valve 100 and free flow and metering valves 104 and 108 which are connected to the actuator through supply lines 102 and 104, respectively. Two-way valve 100 is operable to provide supply and return connections to either of the supply lines or to prevent fluid flow in either direction when neutrally positioned (like valves 86 and 110). Motion in one direction, accordingly, may be had by admitting fluid under pressure through valve 104 operating in free flow to one side of reciprocating vane 42, the rate of motion being controlled by the metered flow of fluid escaping from the other side through valve 108. Controlled motion in the opposite direction, of course, involves free flow of the pressure fluid to the other side of the actuating vane and metered flow through the valve 104.

Motion for inverting the vacuum chuck through rotary hydraulic actuator 72 may be controlled by a system like that disclosed above for controlling the carriage swing. In the illustrated embodiment of the invention, where it is desired to decant fluids from cathode ray tube blanks as they are being inverted, it has been found desirable to employ more than one rate of turn during the inverting operation. Accordingly, a two-way valve 110 is used, as before, as a master control for fluid control in the system, and a combination metering and free-flow valve 114, which depends for its operation upon the direction of fluid flow, is provided in the line 112, which supplies pressure during the decant portion of the head turn, and checks the flow of escaping fluid from actuator 72 during the return portion of the head turning cycle. The other feed line 116 to actuator 72 is provided with check valve 118 which permits the flow of fluid during the return portion of the cycle. During the decant portion of the cycle, the check valve closes and flow of fluid escaping from actuator 72 occurs through the alternate paths provided by by-pass selector valve 124 and metering valves 120 or 122. By-pass selector valve 124 is cam-operated and provides a choice of the fluid flow rates established by metering valves 120 and 122 which are set to provide a rapid rate of turn and a slower rate of turn for use during critical periods in the decant cycle.

In the specific application illustrated, the transfer and decant apparatus 14 is arranged to remove screen settling fluids from successive television picture tube blanks T arriving at the production line transfer location 20. At the same time, the picture tube is inverted for subsequent operations. In order to coordinate the operations of the assembly line with that of the decant and transfer unit, provision is made for interconnection of the conveyor unit prime movers with the timing unit 33.

In the illustrative embodiment of the machine, provision is made for starting the decant and transfer cycle by means of a microswitch 132 mounted on conveyor 10, which may be used to sense either the presence of a pallet or a tube blank, and so start the timing motor 140. A series of cam controlled switches 134, 136, 138 synchronized with the operation of the decant and transfer mechanism by timing shaft 74 and associated cams 133, 135, 137 is then used to control stopping of the timing shaft motor 140, operation of the vacuum supply, and operation of the conveyors 10, 12, respectively.

A typical cycle of operation for the transferring and decanting of screen settling fluid of television picture tube blanks will now be described.

As the leading picture tube blank advances on conveyor 10, into the transfer position 20, the microswitch 132 is operated, energizing timing motor 140 and stopping forward motion of the conveyors 10, 12. As timing shaft 74 is turned, vacuum control switch 136 is closed by its associated cam and operates the vacuum equipment, causing suctional forces to be developed within the vacuum 30, which is underneath the picture tube blank, causing the head 30 to adhere to the face of the picture tube blank. Cam 82 then operates valve 86 to the "raise" position, sending fluid under pressure through line 84 into the upper end of lift cylinder 64. Meanwhile, by-pass valve 94 is maintained closed by cam 83. Valve 86 continues to supply fluid to the lift cylinder until sufficient time has elapsed for the desired vertical movement of carriage 52 and valve 86 is then returned to neutral position while check valve 90 prevents reverse flow of the fluid from the upper half of cylinder 64, maintaining it in raised position. Meanwhile, after carriage 52 has raised head 30 to a clearance position above pallet 22, valve 100 has been actuated by cam 85 and rotation of carriage 52 about its vertical axis has been started. This motion continues until the head 30 has been brought to an elevated position above the first pallet 22' in drying line 12, at which time cam 85 closes the valve 100, stopping flow of hydraulic fluid to the "forward" side of head swing rotary actuator 38. Similarly, cam 87 has actuated valve 110, applying hydraulic pressure to the "decant" actuator 72, beginning the process of turning over the head 30 and the tube blank T which it carries. During the initial portion of the decanting operation, cam 91 operates valve 124 so as to connect the slow-set metering valve 122 into the path of return fluid from actuator 72.

It is necessary during this first part of the decanting operation to tilt the picture tube blank very slowly so as to avoid disturbing the screen settling fluid, as either substantial lateral oscillatory movement of the fluid body, or the presence of waves on the surface of the settling fluid will upset the even layer of phosphor recently settled on the inner face of the tube, producing unevenness in the layer which is immediately detectable by the eye of the viewer of the finished tube in the form of intensity variations in the television picture. The rate of turn may be increased, however, towards the end of the decant cycle when the bulk of the fluid has been decanted and the screen is no longer covered by the settling fluid. For this purpose, cam 91 is timed to operate valve 124, switching metering valve 122 out of the return circuit and switching fast metering valve 120 in its place, the remainder of the turning operation being carried out at the higher rate. Valve 110 is operated to the neutral position when inversion of the head 30 is complete, leaving the tube T in a neck down position over the pallet 22′ on drying conveyor 12. Cams 82, 83 then operate valves 86, 94, respectively, lowering head 30 and depositing the inverted, emptied tube blank T on pallet 22′. Cam 135 then actuates vacuum control switch 136, releasing tube blank T from the gripping head 30.

Gripping head 30 is then returned to the loading position 20 in conveyor 10 by reversing the motion previously described, the rates of movement of the various actuators being controlled, however, by the separate metered flow valves in each of the lines. As rotation of the timing shaft 74 continues, cams 82, 83, 85 and 87 operate valves 86, 94, 100 and 110. Valves 86 and 94 operate, as before, to raise the gripping head 30, but, since little height is required for the return motion, need not be operated as long. Simultaneously, valves 100 and 110 are operated in the reverse direction from that previously employed and as the actuators turn at the higher rate permitted by metered flow through valves 104 and 114. Valves 100 and 110 are closed again by their cams when the head 30 again faces upward and is located over the loading position 20. The head is then lowered to its original loading position within the framework of the conveyor 10 by reversal of the valves 86 and 94.

Cam 137 then closes switch 138 which controls the operation of the conveyor indexing mechanisms, causing conveyor 10 to advance and carry another tube blank, ready for decanting, into position over the gripping head 30. Similarly, the loaded pallet 22′ on conveyor 12 is moved away and an empty one put in its place at loading station 20′. Cam 133 operates switch 134 immediately after the operation of switch 138, turning off the timing motion and leaving the machine in condition to start a new cycle.

From the preceding description, it can be seen that considerable latitude in timing is provided for by the use of cams for controlling the various individual motion producing devices utilized in the machine. In a typical decanting cycle, the machine may be timed to operate over a period of as much as 2½ minutes, the gear train between motor 140 and timing shaft 74 being set to produce one turn of the timing shaft during this interval. During this period of time the forward, or decant, swing of the machine may take about 2¼ minutes, and the return swing about 15 seconds. When the machine is merely used as a transfer device, that is, when the decant operation is omitted, the forward swing may require about 15 seconds and so the period of the timing shaft may be 30 seconds. Other timing arrangements may, of course, be employed, depending on the arc of swing required, the type of article being handled, etc.

What is claimed is:

1. In assembly line screen settling equipment for television tubes, a first conveyor for moving successive cathode ray tube blanks through a settling cycle while filled with a screen settling fluid, a second conveyor for moving successive tube blanks through a drying cycle after said settling cycle, and a transfer and decant station interposed between said first and second conveyors and arranged to pour off said settling fluid from successive tube blanks received from said first conveyor and to place the emptied tube blanks on said second conveyor, said station including a gripping head movable between said first and second conveyors, actuating means providing a varied speed turning of said gripping head during movement between said conveyors, and a fluid pressure system having a plurality of selective flow paths connected to said actuating means for operation in sequence to provide the varied speed turning movement of the gripping head.

2. In assembly line screen settling equipment for television tubes, a first conveyor for moving successive cathode ray tube blanks through a settling cycle while filled with a screen settling fluid, a second conveyor for moving successive tube blanks through a drying cycle after said settling cycle, and a transfer and decant station interposed between said first and second conveyors and arranged to pour off said settling fluid from successive tube blanks received from said first conveyor and to place the emptied tube blanks on said second conveyor, said station including a gripping head movable between said first and second conveyors, a reversible rotary hydraulic actuator providing a varied speed turning of said gripping head while moving between said conveyors, and a hydraulic system having a plurality of selective flow paths connected to said actuator for operation in sequence to provide the varied speed turning movement of the gripping head.

3. Transfer equipment for handling television picture tubes during processing including first and second intermittently operable conveyors and transfer mechanisms coordinated with the operation of said conveyors for receiving said tubes from said first conveyor and delivering said tubes in an inverted position to said second conveyor, said transfer mechanisms including a gripping head mounted for compound movement between said first and second conveyors and a fluid pressure system having metered flow paths for imparting and controlling said compound movement of said head including means for moving said head vertically, means for swinging said head horizontally, and means for inverting said head during the swinging motion.

4. Transfer equipment for handling television picture tubes during processing including first and second intermittently operable conveyors and transfer mechanisms coordinated with the operation of said conveyors for receiving said tubes from said first conveyor and delivering said tubes in an inverted condition to said second conveyor, said transfer mechanisms including a gripping head mounted for compound movement between said first and second conveyors and a fluid pressure system having metered flow paths for imparting and controlling said compound movement of said head including means for moving said head vertically, means for swinging said head horizontally, and means for inverting said head at a varied speed during the swinging motion.

5. Transfer equipment for handling television picture tubes during processing including first and second intermittently operable conveyors and transfer mechanisms coordinated with the operation of said conveyors for receiving said tubes from said first conveyor and delivering said tubes in an inverted condition to said second conveyor, said transfer mechanisms including a gripping head mounted for compound movement between said first and second conveyors and a hydraulic system having metered flow paths for imparting and controlling said compound movement of said head including means for moving said head vertically, means for swinging said head horizontally, and means including plural parallel selective flow paths operable in sequence for inverting said head at a varied speed during the swinging motion.

6. In combination with first and second conveyors, transfer mechanisms coordinated with said conveyors for receiving articles from said first conveyor, inverting said articles, and thereafter delivering said articles in inverted condition to said second conveyor, said mechanisms including a carriage mounted for reciprocation along an axis and for swinging movement about said axis between said first and second conveyors, a gripping head mounted on said carriage for rotation whereby an article may be inverted at a varied speed during transfer, means for reciprocating said carriage along said axis, means for controlling said swinging movement of said carriage, and a fluid pressure system having metered flow paths connected to said head to provide the varied speed rotation of said head.

7. An article transfer mechanism operable between spaced transfer points comprising a head for gripping the articles, fluid pressure means for imparting a substantially vibrationless movement to said head between the transfer points, said fluid pressure means including metered hydraulic actuating means for moving said head vertically, metered hydraulic actuating means for swinging said head horizontally, and metered hydraulic actuating means for inverting said head at a varied speed during the swinging motion, and timing means for imparting the vertical, swinging and inverting motions to said head in a prescribed timed sequence.

References Cited in the file of this patent

UNITED STATES PATENTS

| | | |
|---|---|---|
| 2,061,085 | Price | Nov. 17, 1936 |
| 2,224,975 | McNamara | Dec. 17, 1940 |
| 2,259,728 | Bridges | Oct. 21, 1941 |
| 2,359,432 | McNamara | Oct. 3, 1944 |